United States Patent [19]

Urai

[11] 4,323,410
[45] Apr. 6, 1982

[54] METHOD OF MANUFACTURING SEAT CUSHIONS

[75] Inventor: Muneharu Urai, Tokyo, Japan

[73] Assignee: Tachikawa Spring Co., Ltd., Tokyo, Japan

[21] Appl. No.: 199,436

[22] Filed: Oct. 22, 1980

[30] Foreign Application Priority Data

Oct. 31, 1979 [JP] Japan ................................ 54/139835

[51] Int. Cl.³ .................... B32B 31/04; B32B 31/12; B32B 31/20
[52] U.S. Cl. .................... 156/228; 428/159; 428/160
[58] Field of Search ............... 156/228; 428/157, 158, 428/159, 160

[56] References Cited

U.S. PATENT DOCUMENTS

| 2,589,786 | 3/1952 | Engel et al. | 156/228 |
| 3,210,230 | 10/1965 | Tyhurst | 156/228 |
| 3,258,511 | 6/1966 | McGregor, Jr. | 156/228 |
| 3,329,546 | 7/1967 | Scheinert | 156/228 |
| 3,334,001 | 8/1967 | Tyhurst | 156/228 |

Primary Examiner—William J. Van Balen
Attorney, Agent, or Firm—Oldham, Oldham, Hudak & Weber Co.

[57] ABSTRACT

In a method of manufacturing a permeable seat cushion, a seat surface covering of premeable fabric material of bag-like structure is formed by joining a seating portion to side portions, and the seating portion of the seat surface covering is pressed in a turned-over relation between a pair of dies after application of heat thereto. A skinless molded block or profile-cut slab of foamed polyurethane is then bonded to the seating portion, and the side portions are turned over to complete the seat cushion.

7 Claims, 12 Drawing Figures

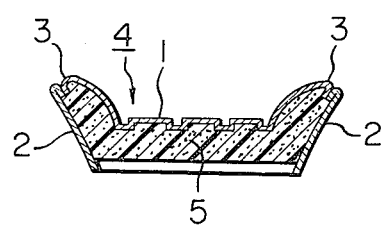
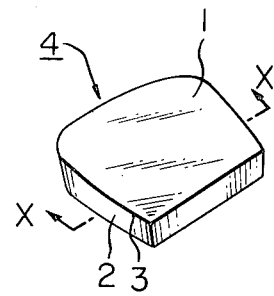
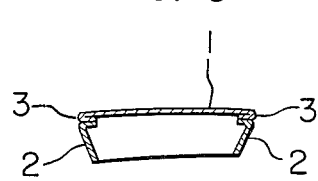
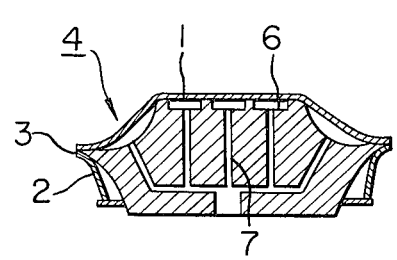
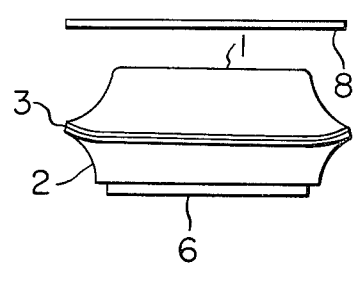
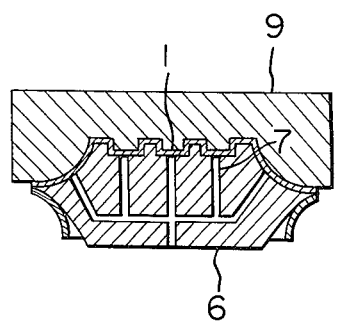

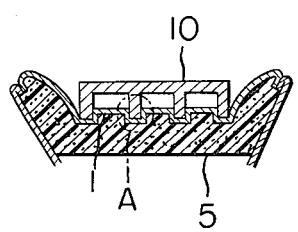
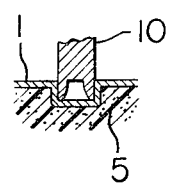
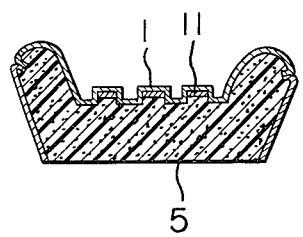
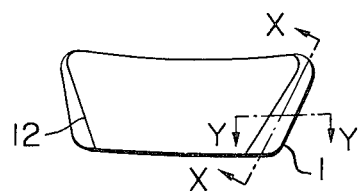
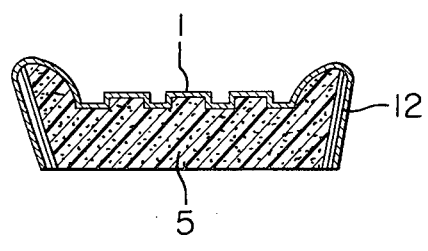
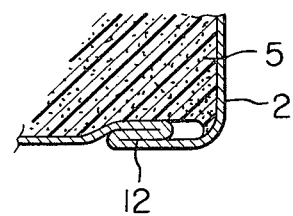

METHOD OF MANUFACTURING SEAT CUSHIONS

BACKGROUND OF THE INVENTION

This invention relates to a method of manufacturing a seat cushion which is satisfactorily permeable to air and provides a comfortable feeling to sit thereupon when used for seats in automobiles and various types of furniture.

A covering material such as a fabric material with or without a vinyl coating is most commonly used in many of prior art seat cushions for seats in automobiles. One of typical prior art processes employed for the manufacture of a seat cushion of this kind comprised the steps of cutting a web of fabric material with or without a vinyl coating into pieces corresponding to the portions including the seating portion and side portions, sewing together these pieces of fabric material to form a seat surface covering of bag-like structure, inserting a filler pad of cushion providing material such as foamed polyurethane into the internal space of the seat surface covering of bag-like structure, and mounting the resultant assembly on a seat frame provided with springs.

However, such a prior art manufacturing process required an extended time and a lot of labor. In addition, the prior art process was defective in that twists and creases impairing the beautiful appearance of the products occurred frequently, and some of the products were extremely distorted to such an extent that the remedy thereof required also an additional extended time and much labor, together with an additional cost.

In an effort to obviate these prior art defects, there has been recently proposed a method of manufacturing a seat cushion by applyilng a back coating of vinyl or like material to a seat-covering providing fabric material for the purpose of shaping under vacuum, heating the fabric material, shaping the fabric material into the form of a seat surface covering of bag-like structure by use of shaping dies or any other suitable means, and in lieu of inserting a filler pad of cushion providing material into the seat surface covering of bag-like structure, injecting a solution of polyurethane into the internal space of the seat surface covering of bag-like structure to integrally mold foamed polyurethane with the seat surface covering being retained between the dies. Such an integral molding process obviates the aforementioned prior art defects, and a distinct embossed pattern can be produced on the product.

However, such a method finds a limited application and is only applicable to vinyl-coated fabric materials or fabric materials having a back coating of vinyl or like material. Further, in the product obtained by the integral molding of foamed polyurethane with the seat surface covering of fabric material, the poplyurethane solution tends to penetrate through the texture thereby hardening the seat surface covering or producing blurs on the surface thereof, or the solution may solidify to impair the otherwise beautiful appearance of the product. Thus, the seat cushion obtained by the proposed method has been defective in that the seat surface covering has no permeability to air, the otherwise beautiful external appearance is impaired, and the seat cushion does not provide the desired comfortableness to sit thereupon.

A prior art seat cushion obtained by bonding a filler pad of foamed polyurethane to a seat surface covering of fabric material of bag-like structure has also been defective in that a thin layer tending to be formed on the surface of the filler pad of foamed polyurethane by, for example, the mold releasing agent used in the molding step deteriorates the permeability to air and acts as a source of unusual noise, and also, separation of the bonded portions together with stripping of the thin surface layer tends to occur.

Further, an integrally molded product having a defect in its seat surface covering of fabric material or a defect in the foamed polyurethane, which is the cushion providing material, must be wasted as a reject resulting in a low yield rate of final products.

Further, the material costs have become necessarily high when a single seat surface covering of highly extensible fabric material is used to continuously cover the seat cushion portions including the seating portion and side portions to meet a specification requirement. Further, when the seat cushion includes undercuts in its side portions, it has been very difficult to cover the side portions besides the seating portion with the single seat surface covering.

SUMMARY OF THE INVENTION

It is therefore a primary object of the present invention to obviate all of the defects of the prior art method. According to the present invention, a novel and improved method of manufacturing a seat cushion is provided which ensures the permeability to air as well as the feeling of soft touch peculiar to a seat surface covering of fabric material, not obtainable with the aforementioned prior art process of integral molding, and which makes possible to produce a distinct embossed pattern not obtainable with the aforementioned step of filling or lapping the filler pad of foamed polyurethane and to produce even a decorative pattern or a handcraft-like fine pattern such as a stitch pattern (like that provided by a sewing machine) or a button-like pattern, when so required.

In accordance with the present invention, there is provided a method of manufacturing a permeable seat cushion comprising the steps of preparing a seat surface covering of fabric material including side portions integrally joined to the peripheral edges of a seating portion of the seat cushion, placing the seat surface covering in a turned-over relation on a lower die of shape complementary to that of the seat surface covering, heating the seating portion while fixing the seating portion at the joint between it and the side portions, urging an upper die of the same shape as that of the seating portion toward and onto the lower die supporting the seat surface covering thereon thereby shaping the seat surface covering into a desired configuration, urging the upper die away from the lower die while the seat surface covering is maintained in position on the lower die, applying a bonding agent to at least one of the back surface of the heating portion and the front surface of a skinless molded block or profile-cut slab of cushion providing material of the same shape as that of the front surface of the seat cushion, bonding the molded block or profile-cut slab of cushion providing material to the seating portion of the seat surface covering, removing the assembly from the lower die, and turning over the side portions of the seat surface covering to provide the seat cushion.

BRIEF DESCRIPTION OF THE DRAWINGS

Preferred embodiments of the method according to the present invention will be described in detail with reference to the accompanying drawings, in which:

FIG. 1 is a schematic vertical sectional view showing the structure of a seat cushion manufactured by an embodiment of the method according to the present invention;

FIG. 2 is a schematic perspective view of the seat surface covering of bag-like structure in FIG. 1;

FIG. 3 is a schematic sectional view taken along the line X—X in FIG. 2;

FIG. 4 is a schematic sectional view of a lower die;

FIG. 5 is a schematic front elevation view of an upper die, a heater and a fabric material providing the seat surface covering;

FIG. 6 is a schematic sectional view of the upper and lower dies;

FIG. 7a is a schematic sectional view of a forming die and the product;

FIG. 7b is an enlarged view of the zone A shown in FIG. 7a;

FIG. 8 is a schematic sectional view of a product obtained by bonding filler pads to the structure shown in FIG. 7a;

FIGS. 9, 10a and 10b show a seat cushion manufactured by another embodiment of the present invention and including overhanging side portions provided by extending a single seat surface covering to form the side portions, in which:

FIG. 9 is a schematic back view of the seat cushion;

FIG. 10a is a schematic sectional view taken along the line X—X in FIG. 9; and

FIG. 10b is a schematic sectional view taken along the line Y—Y in FIG. 9.

DESCRIPTION OF THE PREFERRED EMBODIMENTS

Referring now to FIG. 1, a seat cushion manufactured according to an embodiment of the present invention comprises a seat surface covering of bag-like structure made of a fabric material and designated generally by the numeral 4. The seat surface covering 4 includes a seating portion 1 (a body portion), side portions 2 (skirt portions) and a joint 3 between the seating portion 1 and the side portions 2. There may also be rear side portions and a head rest portion of a front back, although not shown in FIG. 1. The numeral 5 designates a mass of cushion providing material, for example, a skinless molded block or profile-cut slab of foamed synthetic resin material such as foamed polyurethane.

FIG. 2 shows in perspective view only the seat surface covering 4 of bag-like structure before being shaped into the form shown in FIG. 1. The elongation during the step of shaping of the seating portion 1 itself of the seat surface covering 4 of original form shown in FIG. 2 is previously estimated, and the side portions 2 are cut from a web of fabric material to be wide enough to deal with the estimated elongation of the seating portion 1, or they may be cut from such a web without taking into account the elongation of the seating portion 1 depending on the specification. The seating portion 1 is then joined to the side portions 2, whose shape will not appreciably change even after the step of shaping, at the joint 3 together with a welt (not shown) or directly without such a welt by means such as sewing with a sewing machine or welding with a high-frequency welder, thereby forming the seat surface covering 4 of bag-like structure shown in FIG. 1.

FIG. 3 is a schematic sectional view taken along the line X—X in FIG. 2. It will be seen from FIG. 3 that the side portions 2 taper gradually toward each other from the joint 3 in an overhanging fashion.

FIG. 4 shows a lower die 6 having a surface shape conforming to that of the seating portion 1 shown in FIG. 1, and the seating portion 1 supported thereon is shown upside down relative to FIG. 1. The seat surface covering 4 of bag-like structure shown in FIGS. 2 and 3 is bodily turned over and fixedly held on the lower die 6 at the position of its joint 3 between the seating portion 1 and the side portions 2. The joint 3 retains a predetermined shape and position without being stretched.

FIG. 5 shows that a heater 8 is disposed opposite to the seating portion 1 of the seat surface covering 4. After heating by the heater 8, the heater 8 is moved away from the illustrated position, and an upper die 9 including a shaping or embossing portion complementary to the that of the lower die 6 as shown in FIG. 6 is urged downward toward the lower die 9. The seating portion 1 is pressed between the upper and lower dies 6 and 9 to be shaped or embossed in a desired pattern. During this step of pressing, vacuum suction is applied through a plurality of small-diameter ports 7 of the lower die 6 to assist in the shaping or embossing. Upon completion of the step of shaping or embossing of the seating portion 1 of the seat surface covering 4, the upper die 9 is urged upward away from the lower die 9, and then, the lower die 6 is moved the lateral direction.

Such vacuum suction is effective in liberating air arrested in the texture sandwiched between the upper and lower dies 6 and 9 thereby ensuring formation of a distinct embossed pattern produced by the shaping or embossing pressure applied to the fabric material by these dies. Vacuum suction is also effective in retaining the portions of the fabric material in the vicinity of the small-diameter vacuum suction ports 7 thereby preventing relative displacement of the fabric material being shaped at a time by the combination of the upper and lower dies 6 and 9.

Although not shown in FIG. 6, the upper die 9 may be also provided with such small-diameter vacuum suction ports when required. Further, depending on the pattern, a rubber sheet (not shown) may be put in place of the upper die 9, and vacuum suction may be similarly applied through the small-diameter ports 7 of the lower die 6.

After the transfer of the lower die 6 in the lateral direction, a bonding agent is coated on necessary portions of a skinless molded block or profile-cut slab 5 of cushion providing material, previously prepared to have a configuration conforming to that of the seating portion 1, and/or necessary portions of the seating portion 1 kept mounted on the lower die 6. Then, the skinless molded block or profile-cut slab 5 of cushion providing material is placed on the seat surface covering 4 kept supported on the lower die 6, and another die which replaced the upper die 9 shown in FIG. 6 is urged downward to bond the skinless molded block or profile-cut slab 5 of cushion providing material to the seat surface covering 4, although not shown in the drawings. Upon completion of the step of bonding, the bonded assembly is removed from the lower die 6, and the side portions 2 are turned over to provided the form shown in FIG. 1.

It is one of the features of this embodiment that the seat cushion having the overhanging side portions 2 as shown in FIG. 1 can be obtained.

Subsequently, as shown in FIGS. 7a and 7b, a forming die 10 is used to impart pressure to the corners at the bottom of the recesses of the assembly from the surface side of the seat cushion to sharpen these portions of the recesses, and the assembly is anchored at the lower end edges of the side portions 2 to a seat frame to complete the seat cushion.

The heater 8 shown in FIG. 5 may be eliminated, and a high-temperature gas, for example, steam or high-temperature air may be supplied through the small-diameter ports 7 provided in the lower die 6 and/or the upper die 9 shown in FIGS. 4 and 6 to heat the seating portion 1 of the seat surface covering 4. (The small-diameter ports 7 in the upper die 9 are not shown in FIG. 6.)

As another heating means which replaces the independent heater 8 shown in FIG. 5, a built-in heater (not shown) may be provided in the upper die 9 and/or the lower die 6, so that the temperature of the upper die 9 itself and/or the lower die 6 itself can be raised to simultaneously carry out the step of heating and the step of shaping pressure impartation. In this case, it is preferable to supply water vapor through the small-diameter ports 7. The built-in heaters raise the temperature of the dies 9 and 6 which act therefore as a steam iron, so that the seating portion 1 can be accurately shaped or embossed in the desired pattern.

It is also preferable to apply a thermal shaping stabilizing agent to the sharp corner portions of the recesses in the seating portion 1 of the seat surface covering 4 so that these corner portions can be more accurately and stably shaped, or sharpened.

When so required, a plurality of filler pads 11 may be previously bonded to necessary portions on the surface of the skinless molded block or profile-cut slab 5 of foamed polyurethane as shown in FIG. 8. Further, although not shown, soft and thin filler pads 11 of required shape may be bonded to the surface of the relatively hard and thick skinless slab 5 of cushion providing material so as to form a pattern similar to an embossed pattern, and the seating portion 1 may be bonded to such surface of the slab 5.

The skinless molded block 5 of cushion providing material may have a locally changing hardness. Such a block 5 may be obtained by integral or concurrent foaming of solutions having different specific gravities or by bonding together blocks having different specific gravities.

The material of the seating portion 1 employed in the method according to the present invention is a fabric material having no back coating. Therefore, the properties such as the permeability to air and the feeling of soft touch peculiar to a fabric can be fully exhibited.

The seat surface covering 4 of fabric material is bonded to the skinless block or slab 5 of cushion providing material. In this case, the bonding agent may be applied to the entire surface area or necessary surface areas only of the seat surface covering 4 of fabric material and/or the block or slab 5 of cushion providing material, and the amount of the applied bonding agent may also be suitably selected depending on the required strength of bond. Means such as a spray is preferably used for spraying the bonding agent without impairing the permeability because the bonding agent is sprayed in a dot pattern. In the case of local bonding, the bonding agent may be applied only to those areas at which undesirable creases tend to appear due to the elongation of the covering material itself. It happens sometimes that concentrated deformation occurs always in a limited portion of the bonded areas between the covering material and the foamed polyurethane when an occupant sits on the seat, and due to the creasing of the surface portion of the foamed polyurethane, creasing occurs also in the corresponding portion of the covering material. It is advisable that such an area should be excluded from the areas to be bonded.

The prior art seat surface covering tends to be peeled off the molded block of foamed polyurethane when the latter is provided with a skin or surface layer such as a vinyl resin coating. In the present invention, a skinless molded block of foamed polyurethane or a profile-cut slab of foamed polyurethane is used so that no peel-off occurs and any deterioration of the permeability due to the presence of the skin can be obviated.

In the prior art process of vacuum molding a block of foamed polyurethane on a fabric material which provides the seat surface covering, a fault occurred during the formation of the seat surface covering or during the molding of the foamed polyurethane gives rise to necessarily a counter-fault in the other. The method according to the present invention obviates such a trouble because the foamed polyurethane is bonded to the seat surface covering. Further, according to the prior art process, the seat cushion must be passed through an oven at a high temperature for the purpose of hot-curing the foamed polyurethane, resulting in deterioration of the seat surface covering. In contrast, according to the present invention in which the foamed polyurethane is bonded to the seat surface covering, the foamed polyurethane may be used in a hot-cured state or a cold state, as desired.

The covering material providing the seat portion 1 of the seat surface covering is not limited to a woven or non-woven fabric material such as that referred to hereinbefore. Depending on the specification requirement, the seating portion 1 may be extended so that the portions 1 and 2 can be formed from a single sheet of covering material, with the side portions 2 overhanging.

FIG. 9 is a schematic back view of such a seat cushion manufactured according to another embodiment or a modification of the present invention. FIG. 10a is a schematic sectional view taken along the line X—X in FIG. 9, and FIG. 10b is a schematic sectional view taken along the line Y—Y in FIG. 9. It will be seen that the covering material providing the seating portion 1 is extended to include the side portions 2 which terminate in folded portions 12. When so desired, the corresponding portions of the skinless molded block 5 of foamed polyurethane may be suitably cut to provide slits, and the associated end edges of the seat surface covering may be folded in those slits. Depending on the design, a plurality of decorative creases may be formed in the overhanging side portions 2, although not shown. When such overhanging portions are not provided, an extensible covering material may be used, and the upper and lower dies 9 and 6 may have shaping or embossing portions covering the side portions 2, although not shown. In such a case, a seat cushion of desired configuration can be obtained without the necessity for folding the end edges of the seat surface covering. Thus, the modification employing a single sheet of covering material for the formation of the seat cushion provides also the features described hereinbefore with reference to the embodiments.

The foregoing description has referred to the method of manufacturing a seat cushion by applying heat to the covering material providing the seat portion 1. Depending on the specification requirements, the covering material need not be pressed between the dies under application of heat thereto. Thus, when an extensible covering material capable of being stretched between the dies without application of heat, the covering material may be shaped or embossed between the upper and lower dies 9 and 6 shown in FIG. 6 without application of heat, and the block or slab 5 of foamed polyurethane may then be bonded thereto. Alternatively, the upper die 9 may not be used, and the block or slab of foamed polyurethane 5 may be directly bonded to the covering material.

When a fabric material having no stretchability or little stretchability is pressed between the upper and lower dies 9 and 6 without application of heat thereto, the covering material may be pressed in the gap between the upper and lower dies 9 and 6, and the covering material may not be uniformly pressed between the dies. To avoid such a trouble, the upper die 9 may be split into a plurality of concentric elements, and such die elements may be successively urged downward toward the lower die 6. As another means, the covering material may be sucked by vacuum suction applied through the central one of the small-diameter ports 7 shown in FIG. 4 and is then sucked by vacuum suction applied through the radially outer ports 7 to be sucked successively onto the lower die 6 in the above order, and then, the upper die 9 is urged downward toward the lower die 6 to form the seat surface covering. In this connection, when it is desired to especially sharpen the corners of the recesses in the embossed portion of the seat surface covering formed according to the method which is carried out without application of heat, the step of applying heat may be added to sharpen the edges of the corners.

The present invention is in no may limited to applications to seat cushions having sectional configurations as shown in the drawings illustrating preferred embodiments of the present invention and is equally effectively applicable to various other configurations and designs. Further, although the drawings shown front seat cushions by way of example, the present invention is in no way limited to such an application and is equally effectively applicable to a variety of articles including a front back, a rear seat, and other internal equipment of vehicles, articles of furniture and miscellaneous goods.

It will be understood from the foregoing detailed description of the present invention that a three-dimensional permeable seat cushion ensuring a comfortable feeling to sit upon it can be provided, and when a design similar to that provided by sewing with a sewing machine is demanded, overhanging side portions having a stitch pattern are bonded to the seating portion to meet the design requirement. Unlike the prior art seat cushion obtained by vacuum molding a foamed synthetic resin material such as foamed polyurethane on a fabric material providing a seat surface covering, the seat cushion obtained by the method of the present invention is free from the tendencies of hardening of the seat surface covering and occurrence of creases in the seat surface covering thereby giving a feeling of soft touch when an occupant sits thereupon. The method according to the present invention is also advantageous over the prior art in that the material cost of the seat surface covering can be reduced, and an extensible covering material can be used, although it depends upon the specification requirements. Further, the labor required heretofore for sewing and assembling can be saved, and the overall costs of the seat cushion can be reduced.

What is claimed is:

1. A method of manufacturing a permeable seat cushion comprising the steps of preparing a seat surface covering of fabric material including side portions integrally joined to the peripheral edges of a seating portion of the seat cushion, placing said seat surface covering in a turned-over relation on a lower die of shape complementary to that of the seat surface covering, heating said seating portion while fixing said seating portion at the joint between it and the side portions, urging an upper die of the same shape as that of said seating portion toward and onto said lower die supporting said seat surface covering thereon thereby shaping said seat surface covering into a desired configuration, urging said upper die away from said lower die while said seat surface covering is maintained in position on said lower die, applying a bonding agent to at least one of the back surface of said seating portion and the front surface of a skinless molded block or profile-cut slab of cushion providing material of the same shape as that of the front surface of said seat cushion, bonding said molded block or profile-cut slab of cushion providing material to said seating portion of said seat surface covering, removing the assembly from said lower die, and turning over said side portions of said seat surface covering to provide said seat cushion.

2. A method of manufacturing a seat cushion as claimed in claim 1, further comprising the step of urging a forming die adapted to engage with recesses formed in the seating portion of said seat surface covering toward and into said recesses from the front surface side of said seat surface covering and maintaining said forming die in the position engaging with said recesses for a predetermined length of time thereby shaping the corners of said recesses into a sharply defined configuration.

3. A method of manufacturing a seat cushion as claimed in claim 1, wherein an electric heater is used to carry out said step of heating.

4. A method of manufacturing a seat cushion as claimed in claim 3, wherein said electric heater is built in at least one of said upper and lower dies to raise the temperature of said die so that the step of heating the workpiece and the step of shaping under pressure can be simultaneously carried out.

5. A method of manufacturing a seat cushion as claimed in claim 1, wherein a gas at a high temperature is supplied through small-diameter ports disposed in at least one of said upper and lower dies for heating said seating portion of said seat surface covering by the gas.

6. A method of manufacturing a seat cushion as claimed in claim 1, wherein a plurality of filler pads are interposed at necessary areas between said seat surface covering and said cushion providing material.

7. A method of manufacturing a seat cushion as claimed in claim 1, wherein said seat surface covering is formed from a single sheet of fabric material extending from said seating portion to said side portions.

* * * * *